OSKAR MATTER, OF BONN, GERMANY.

ROOF-COVERING.

1,167,195. Specification of Letters Patent. Patented Jan. 4, 1916.

No Drawing. Application filed January 15, 1914. Serial No. 812,314.

*To all whom it may concern:*

Be it known that I, OSKAR MATTER, Swiss citizen and resident of Bonn-on-the-Rhine, Germany, have invented new and useful Improvements in Roof-Coverings, of which the following is a full, clear, and exact specification.

Roofing materials and the like have been made by impregnating a layer of paper, felt, mixed paper and felt and similar pliable and porous masses with tar, asphalt, a mixture of tar and asphalt or various residues of the fat and oil industries. All products thus obtained have as a natural consequence of their composition the one great disadvantage in common that they are very easily combustible. Many attempts have been made to avoid this inconvenience by additions having for their purpose to diminish the combustibility. For example, water-glass, ammonium salts, cement, graphite, asbestos and iron have been proposed or used. All these additions, however are very deficient for the object in view. They do not yield a product which is practically incombustible and should the roof take fire the materials made in this manner fail completely. This is due to the fact that under the influence of heat the impregnating matter which always has a comparatively low melting point flows away from the paper or felt, whereas the added material does not. Thus the impregnating substance and the added material are separated so that the matter flowing away recovers its original combustibility. The effect of the added materials used is therefore quite illusory.

The present invention rests on the idea that the added material for preventing combustion should have physical properties (melting point for instance) as similar as possible to those of the impregnating substance and should be soluble in the latter so that together they form a homogeneous molten mass. In this manner the defect inherent in the addition hitherto used, namely separation which occurs above the melting point, is avoided; for if a material provided with an addition of the kind now in question is heated to a high temperature the impregnating substance and the addition melt together and the former remains as incombustible as before.

The invention consists therefore in mixing with the impregnating material, such a substance of like physical properties, and for this purpose certain organic compounds of phosphoric acid included under the general term arylphosphates have proved particularly suitable, namely the phosphoric acid esters of phenol and its substitution products. For example triphenyl phosphate, any of the tricresyl phosphates and all possible mixed phenylcresyl phosphates. Moreover all possible mixtures of simple and mixed esters of phosphoric acid with phenol and its substitution products may be regarded as suitable for the purpose in question. These compounds or mixtures of compounds have the property of rendering incombustible roofing materials and the like which are impregnated therewith. If a freely hanging strip of a material made with such a mixture is kindled it does indeed inflame, but the flame is immediately extinguished, in consequence of the action of the added material, whereas all the fabrics hitherto made continue to burn when kindled in the freely hanging condition.

The esters have the essential advantage that they are soluble in all proportions in all impregnating materials such as tar, pitch, asphalt or the like. Their melting points are comparatively close to those of the impregnating materials. Separation above the melting point therefore is not possible. These bodies dissolve in those solvents which dissolve the impregnating substances, for example benzin, benzene or the like. These added materials besides having no tendency to separate from the impregnating mass above the melting point, possess some other remarkably good properties which make them particularly suitable for the purpose in view and constitute by their introduction into the art an essential progress. 1. The pliability and softness of the material is not diminished by the addition of the substances in question. 2. The esters are very stable and do not decompose even when heated above 300° C. 3. The esters are insoluble in water so that they cannot be washed out by water or rain. 4. It follows from 2 and 3 that such added materials are weather-proof. 5. The esters have no acid or alkaline reaction, so that materials impregnated with them can be laid upon metal supports. In respect of these properties the substances are superior to the added materials hitherto known. Thus, water-glass and ammonium salts are freely soluble in water and are quickly washed out by rain.

Again magnesia ammonium phosphate, which indeed is insoluble in water containing ammonia, dissolves in pure water and is therefore washed out in time by rain. Cement and water-glass have the disadvantage that they render the covering material brittle. If these substances are added to the molten impregnating mass they thicken it so that satisfactory saturation of the fiber is rendered difficult and the value of the material is diminished. None of these objections can occur if the added material and the impregnated mass form a molten whole. When iron is used there is the objection that it very quickly rusts and there is another objection, particularly noticeable in iron, but also to a greater or less degree in other materials, such as cement or graphite, namely that the weight of the material is so comparatively great that its general applicability is affected by the high transport costs connected with it.

The invention can be put into practice in various manners according to the conditions in which the substance for hindering combustion is to be used. The substance can be applied either in the molten or in the dissolved condition. The esters which come into consideration dissolve in the same solvents as dissolve the various impregnating materials, such as benzin, benzene or the like. Moreover, the ester or mixture of esters may be added. 1. To the impregnating mass or to the paper or felt layer or to both at the same time at any suitable stage of the manufacture. 2. To the material manufactured in the known manner but still combustible. In respect of these possibilities the following processes may be named: 1. The paper or felt material may be saturated with molten ester or a mixture of esters or with a solution thereof, in a suitable solvent, and may then be treated with the impregnating mass. 2. The ester or mixtures of esters is melted together with the impregnating mass or dissolved together with the latter in a suitable solvent, such as benzin, benzene or the like, and the layer of paper or the like is impregnated with this molten mass or solution. 3. Both the paper or felt and the impregnating mass may receive an addition of the ester or mixture of esters and may then be further worked up. 4. The paper or felt is first treated with the impregnating mass in the usual manner and the still combustible material thus obtained is saturated with the molten or dissolved ester or mixture of esters and further worked up.

Having thus described my invention and the best means I know of carrying the same into practical effect, I claim:—

1. A roofing material having a fibrous base impregnated with a combustible fusible body and a fire-proofing compound having a melting point substantially that of said body.

2. A roofing material having a fibrous base impregnated with a combustible fusible water-proofing body and a fire-proofing body consisting of an arylphosphate having a melting point substantially that of said body.

3. A roofing material having a fibrous base impregnated with a combustible fusible water-proofing body and a fire-proofing body consisting of tri-phenylphosphate the melting point of which is substantially that of said body.

In testimony, that I claim the foregoing as my invention, I have signed my name in presence of two subscribing witnesses.

OSKAR MATTER.

Witnesses:
 CONRAD SCHUBERT,
 LOUIS VANDORY.

Copies of this patent may be obtained for five cents each, by addressing the "Commissioner of Patents, Washington, D. C."